(12) United States Patent
Meroth et al.

(10) Patent No.: US 7,260,325 B2
(45) Date of Patent: Aug. 21, 2007

(54) NETWORK COMPONENT FOR AN OPTICAL NETWORK COMPRISING AN EMERGENCY OPERATION FUNCTION, ESPECIALLY FOR AN OPTICAL NETWORK IN RING TOPOLOGY

(75) Inventors: Ansgar Meroth, Leonberg (DE); Dietmar Meyer, Barsinghausen (DE); Franz-Joseph Petry, Aidlingen (DE)

(73) Assignee: Robert Bosch GmbH, Stuttgart (DE)

( * ) Notice: Subject to any disclaimer, the term of this patent is extended or adjusted under 35 U.S.C. 154(b) by 590 days.

(21) Appl. No.: 10/380,087

(22) PCT Filed: Jul. 11, 2002

(86) PCT No.: PCT/DE02/02544

§ 371 (c)(1), (2), (4) Date: Nov. 5, 2003

(87) PCT Pub. No.: WO03/007554

PCT Pub. Date: Jan. 23, 2003

(65) Prior Publication Data

US 2004/0076429 A1    Apr. 22, 2004

(30) Foreign Application Priority Data

Jul. 11, 2001    (DE) ................................ 101 33 749

(51) Int. Cl.
*H04B 10/08*    (2006.01)
(52) U.S. Cl. ...................... 398/19; 398/1; 398/2; 398/3; 398/17; 398/33; 370/221; 370/222; 370/223; 714/2; 714/4

(58) Field of Classification Search .................. 398/17, 398/19, 1, 2, 3; 385/24, 25; 370/254, 405, 370/222, 460; 359/173; 714/4
See application file for complete search history.

(56) References Cited

U.S. PATENT DOCUMENTS 4,985,888 A * 1/1991 Madge et al. ................ 370/405

(Continued)

FOREIGN PATENT DOCUMENTS

DE    197 22 189    12/1998

*Primary Examiner*—Kenneth Vanderpuye
*Assistant Examiner*—Li Liu
(74) *Attorney, Agent, or Firm*—Kenyon & Kenyon LLP

(57) ABSTRACT

A network component (3d) for an optical network (1) is described, including a coupling device (2; 4, 5) for optical coupling of the network component (3d) to the optical network (1), the coupling device (2; 4, 5) having a receiving module (4) and a transmitting module (5); a first data processing device (8, 9) which is unidirectionally connected to the receiving module (4); a second data processing device (10, 11) which is unidirectionally connected to the transmitting module (5); the first data processing device (8, 9) being unidirectionally connected to the second data processing device (10, 11) for transmitting data to the second data processing device; a detection device (4) for detecting the network status; and a two-way switch (23) for switching of the input of the first data processing device (8, 9) between the receiving module (4) and the output (19) of the second data processing device (10, 11) as a function of the network status detected.

9 Claims, 2 Drawing Sheets

U.S. PATENT DOCUMENTS

| | | | |
|---|---|---|---|
| 5,127,067 A * | 6/1992 | Delcoco et al. | 385/24 |
| 5,299,312 A * | 3/1994 | Rocco, Jr. | 714/4 |
| 5,542,013 A * | 7/1996 | Kaplow et al. | 385/25 |
| 6,009,491 A | 12/1999 | Rode et al. | |
| 6,650,625 B1 * | 11/2003 | Norizuki et al. | 370/254 |
| 2002/0186439 A1 * | 12/2002 | Buabbud et al. | 359/173 |

* cited by examiner

NETWORK COMPONENT FOR AN OPTICAL NETWORK COMPRISING AN EMERGENCY OPERATION FUNCTION, ESPECIALLY FOR AN OPTICAL NETWORK IN RING TOPOLOGY

BACKGROUND INFORMATION

Multimedia systems in contemporary motor vehicles are designed as network systems which utilize optical or electrical bus systems based on ring topology. Key components (e.g., a control unit) whose internal structures are made up by a plurality of individual components (e.g., man-machine-interface-processor, tuner, gateway, etc.) may be interconnected in such a ring topology. For reasons of bus conformity, the mounting of these components in a housing requires a message and data exchange via the external bus, i.e., an internal data exchange between individual components which are independent of one another is not permissible. The components combined within one device act outwardly like separate logical devices.

If, in such a configuration, an internal gateway is connected to the interior CAN of the vehicle, e.g., via the CAN bus, then the relay of CAN messages to the internal components of the device and the communication between the components cease to take place in the event of failure of the external optical ring. Interruption of the ring thus causes complete failure of the system.

FIG. 2 shows the design of a known multimedia system for motor vehicles including an optical bus system 1 in the form of ring topology. D2B, MOST, or similar systems may be used here as bus systems common in motor vehicles. Additional components 3a through 3d are integrated into this optical ring.

A specific component 3d, explained here in greater detail, is optically coupled to optical bus system 1 via a connector system 2 which in turn is composed of a receiving module 4 and a transmitting module 5. Receiving module 4 receives optical signals from optical bus system 1 and converts them into electrical signals. Electrical signals are converted into optical signals in transmitting module 5 and are fed into ring 1.

The internal structure of interconnected component 3d having independent individual components 6 and 7 is schematically illustrated in FIG. 2. Component 6 has a transceiver 8 and a processor 9. In addition to transceiver 10 and processor 11, component 7 has an additional interface for exchanging data and commands with other common bus systems in the motor vehicle via lines CAN_H and CAN_L, implemented here as CAN bus interface 12, which is connected to processor 11 via bus B3. Line 22 is connected to an output STATUS of connector system 2 and signals activity (light) on optical ring 1 to processors 9 and 11 of internal components 6 and 7.

Optical signals from ring 1 are available as electrical signals at output RX_DATA of receiving module 4 on line 13 and are relayed to input 15 of transceiver 8 of component 6.

Using transceiver 8, processor 9 may pick up data and commands from the ring via bus B1 and feed them into input 18 of transceiver 10 via output 16 of transceiver 8 and line 17. Using transceiver 10, the data exchange from processor 11 takes place via bus B2, processor 11 feeding its data into input TX_DATA of the transmitting module via output 19 of transceiver 10 and line 21. Data and commands are available on ring 1 after electrical/optical conversion in transmitting module 5.

It is apparent in FIG. 2 that an electrical ring, composed of line 13, transceiver 8, line 17, transceiver 10, line 21, and connector system 2, exists after optical/electrical conversion by receiving module 4 and electrical/optical conversion by transmitting module 5 inside component 3d.

If processor 11 receives data, which is intended for processor 9, via CAN interface 12 or if data exchange between processors 9 and 11 is to occur, this may only take place via optical ring 1, line 13, transceiver 8, line 17, transceiver 10, and line 21. The coupling point between the optical bus system and the electrical ring is formed by connector system 2. Data exchange between the internal components of the device ceases to take place if optical bus system 1 is interrupted or connector system 2 has faulty contacts. This results in complete failure of the device, even if the device could also be operated inside the device or via other motor vehicle-specific interfaces (e.g., CAN interface 12) without additional nodes from optical bus 1.

An object of the present invention is to provide a network component for an optical network including an emergency running function, in particular for an optical network based on ring topology, which ensures minimum emergency running properties (e.g., usability by the driver, error indicator, acoustic warning signals, maintenance of minimum (radio) functions) within the component in the event of interruption of the optical or electrical ring.

SUMMARY OF THE INVENTION

The network component for an optical network including an emergency running function according to the present invention, in particular for an optical network based on ring topology, has the following advantages:
- no further internal device interfaces are required for the emergency running property mentioned above;
- no additional message catalog is required;
- due to the electrical interconnection of the components within the network component, full performance capacity of the same software may be used during emergency and normal operation;
- this concept is expandable to the desired extent within the network component. Any number of additional components may be interconnected at the linkage point between the first and second data processing devices.

The idea on which the present invention is based is to maintain an emergency running property of different key components within the network component by having these key components interconnected in a minimum ring system. The full functionality of the network component may then be utilized, less the functions which are made available on the optical ring by other bus nodes.

According to a preferred refinement, the coupling device includes an optical connector system.

According to a further preferred refinement, the receiving module includes the detection device for detecting the network status and outputs a logical electrical signal of at least one bit corresponding to the respective active/non-active network status.

According to a further preferred refinement, the first data processing device and/or the second data processing device are connected to the detection device.

According to a further preferred refinement, the first data processing device and/or the second data processing device each have a transceiver and a processor connected to it.

According to a further preferred refinement, the switchover device receives the logical electrical signal as a control signal and, if the network is active, connects the input of the first data processing device to the receiving module and, if the network is not active, connects the input of the first data processing device to the output of the second data processing device.

According to a further preferred refinement, the first data processing device and/or the second data processing device are connected to a wire-bound network via an interface.

According to a further preferred refinement, a missing logical electrical signal is output as a fault message by the first data processing device and/or the second data processing device on a display or via the interface after transmitting its own message to indicate an active network status.

DETAILED DESCRIPTION

Figure 1:
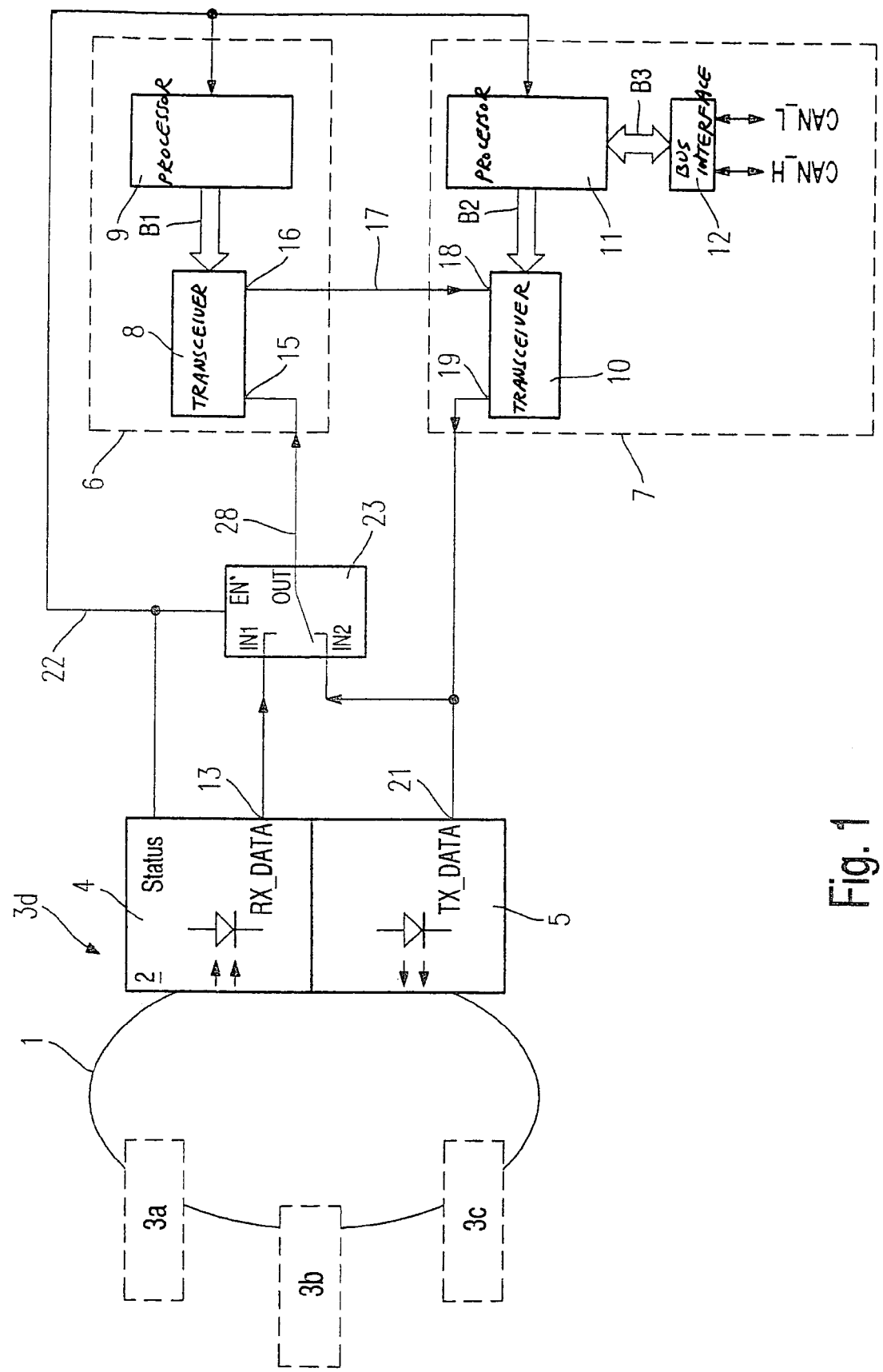
FIG. 1 shows the structure of a multimedia system for motor vehicles including an emergency running property according to one embodiment of the present invention.
Figure 2:
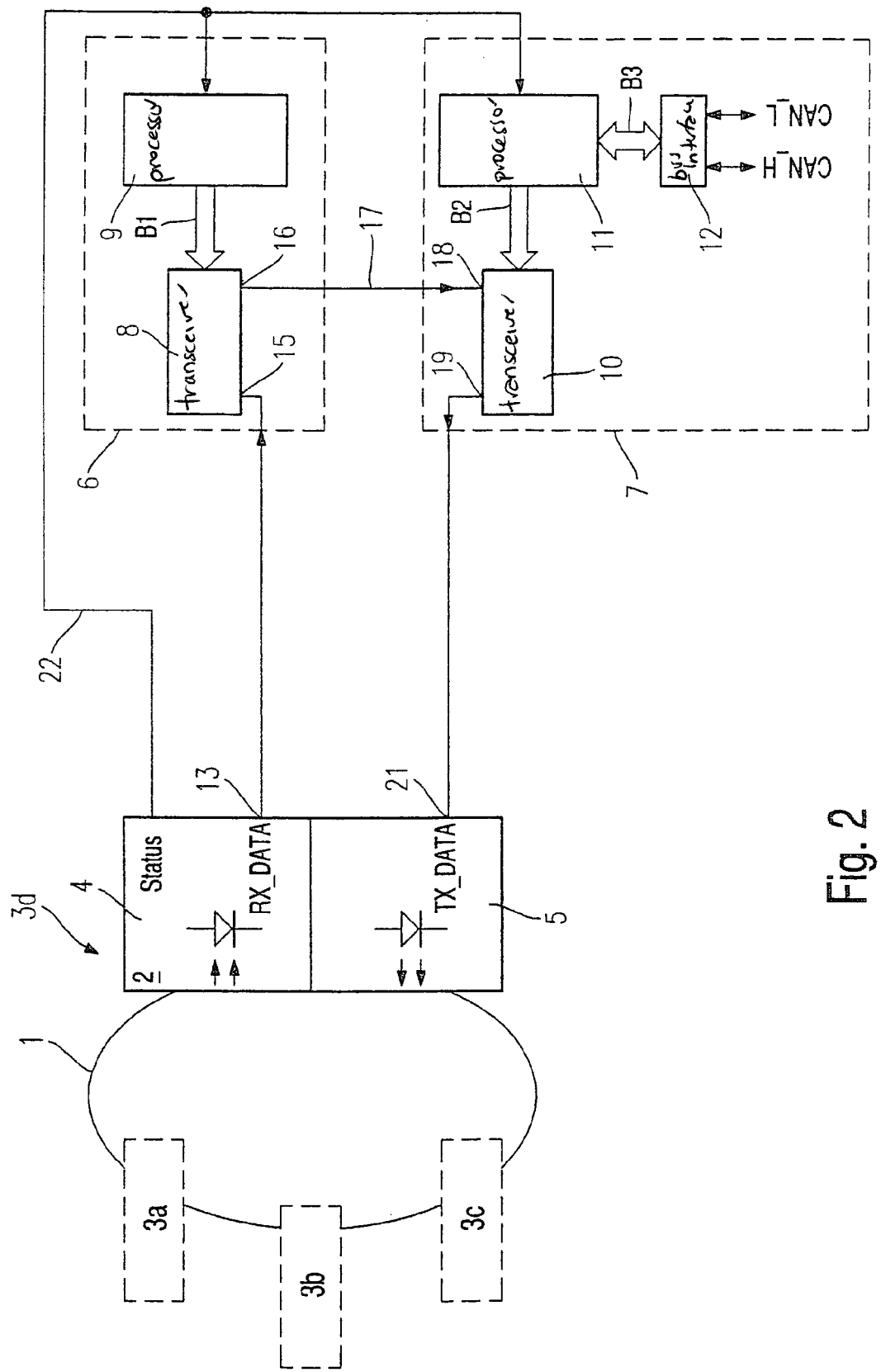
FIG. 2 shows the structure of a known multimedia system for motor vehicles.

FIG. 1 shows the structure of a multimedia system for motor vehicles including an emergency running property according to an embodiment of the present invention. The same reference numbers in FIG. 1 indicate the same components or components having the same functions as in FIG. 2.

In this embodiment, a switchover device 23 for ensuring emergency running properties is inserted according to FIG. 1. Switchover device 23 is connected to output RX_DATA of connector system 2 via its input IN1 and line 13. Second input IN2 of switchover device 23 is in contact with line 21 and is thus connected to output TX_DATA of connector system 2. Output OUT of switchover device 23 is connected to input 15 of transceiver 8 via line 28. Input EN' of switchover device 23 is connected to line 22.

Switchover device 23 is structured so that its output OUT is connected to one of the inputs IN1 or IN2 as a function of the signal voltage at input EN'. The potential at EN' in FIG. 1 is selected such that at potential zero input IN1 is connected to output OUT, i.e., at potential 1 input IN2 is connected to output OUT.

According to the application, the potential at EN' may be reversed by the selection of an appropriate switch or suitable switching actions.

In the idle state of the device configuration illustrated in FIG. 1 there is no light on optical ring 1 and potential 1 is applied to EN' of two-way switch 23 via line 22. Input IN2 is connected to output OUT. A signal transmitted from processor 9 via bus B1 reaches input 18 of transceiver 10 via output 16 of transceiver 8 and line 17. The signal is relayed from here to input TX_DATA of connector system 2 via output 19 of transceiver 10 and line 21. After electrical/optical conversion in transmitting module 5, the signal transmitted from processor 9 is applied to optical ring 1 which thus enters the active state.

Bus activity is signaled to processors 9 and 11 via zero potential on line 22 connected to input EN' of two-way switch 23 which connects input IN1 to output OUT due to the potential change. After optical/electrical conversion in receiving module 4, the signals from optical ring 1 reach input IN1 of two-way switch 23 via output RX_DATA of receiving module 4 and line 13, output OUT of two-way switch 23 being connected to input 15 of transceiver 8 via line 28.

The bus buildup is completed: External components 3a through 3c and components 6 and 7 within the device may exchange data among each other.

Interruption of optical ring 1 or faulty connections at connector system 2 result in the complete failure of the entire bus system. In the present embodiment this is circumvented within the device due to the fact that in the event of such a fault, line 22, due to the missing status "bus active," continues to carry potential 1. Therefore, two-way switch 23 continues to connect input IN2 to output OUT and closes an electrical ring within the device via line 28, transceiver 8, line 17, transceiver 10, and line 21. The communication between the components within the device thus persists and communication with devices connected to this bus system may take place via an interface normally used in motor vehicles, e.g., CAN interface 12.

After transmitting its own message, processors 9 and 11 may indicate or output this error by the missing status message of line 22, e.g., on a display or via CAN interface 12.

Although the present invention has been described above on the basis of a preferred exemplary embodiment, it is not limited to it, but it is rather modifiable in many ways.

In particular, the detection of the network status according to the above embodiment is only exemplary and could also be performed by one of the processors, for example.

LIST OF REFERENCE NUMBERS:

| | |
|---|---|
| 3a–d | network components |
| 1 | optical network |
| 2 | connector system |
| 4 | receiving module |
| 5 | transmitting module |
| STATUS | signal output for network status |
| RX_DATA | data output |
| TX_DATA | data input |
| 22, 13, 21, 17, 28 | lines |
| 6, 7 | first, second data processing device |
| 8, 10 | transciever |
| 9, 11 | processor |
| B1–B3 | buses |
| 15, 18 | inputs |
| 16, 19 | outputs |
| 12 | CAN interface |
| CAN_H, CAN_L | CAN bus signals |
| 23 | two-way switch |
| IN1, IN2, EN | inputs of 23 |
| OUT | output of 23 |

What is claimed is:

1. A network component for an optical network comprising:
   a coupling device for optically coupling the network component to the optical network, the coupling device including a receiving module for converting optical network data into electrical data and including a transmitting module for converting electrical data into optical network data;
   a first data processing device unidirectionally connected to the receiving module for receiving electrical data from the receiving module;
   a second data processing device unidirectionally connected to the transmitting module for transmitting electrical data to the transmitting module, the first data processing device being unidirectionally connected to the second data processing device for transmitting data to the second data processing device;
   a detection device for detecting a network status; and a two-way switch for switching an input of the first data processing device between the receiving module and an output of the second data processing device as a function of the network status detected.

2. The network component according to claim 1, wherein the optical network is based on ring topology.

3. The network component according to claim 1, wherein the coupling device includes an optical connector system.

4. The network component according to claim 1, wherein the receiving module includes the detection device and outputs a logical electrical signal of at least one bit corresponding to a particular active/non-active network status.

5. The network component according to claim 1, wherein at least one of the first data processing device and the second data processing device is connected to the detection device.

6. The network component according to claim 1, wherein at least one of the first data processing device and the second data processing device includes a respective transceiver and a processor connected thereto.

7. The network component according to claim 4, wherein the switch receives the logical electrical signal as a control signal and connects an input of the first data processing device to the receiving module if the network status is active and connects the input of the first data processing device to an output of the second data processing device if the network status is non-active.

8. The network component according to claim 1, wherein the second data processing device is connected to a wirebound network via an interface.

9. The network component according to claim 8, wherein a missing logical electrical signal for indicating an active network status is one of indicated on a display and output via the interface as an error message by at least one of the first data processing device and the second data processing device after transmitting its own message.

* * * * *